US011898467B2

(12) United States Patent
Ozog

(10) Patent No.: US 11,898,467 B2
(45) Date of Patent: Feb. 13, 2024

(54) AIRCRAFT ENGINE STRUTS WITH STIFFENING PROTRUSIONS

(71) Applicant: PRATT & WHITNEY CANADA CORP., Longueuil (CA)

(72) Inventor: Mateusz Ozog, Hucisko (PL)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 17/650,756

(22) Filed: Feb. 11, 2022

(65) Prior Publication Data

US 2023/0258098 A1    Aug. 17, 2023

(51) Int. Cl.
*F01D 9/04* (2006.01)
*B64D 27/10* (2006.01)
*B64D 27/26* (2006.01)

(52) U.S. Cl.
CPC ............. *F01D 9/041* (2013.01); *B64D 27/10* (2013.01); *B64D 2027/262* (2013.01); *F05D 2220/323* (2013.01); *F05D 2240/12* (2013.01)

(58) Field of Classification Search
CPC ..... B64D 2027/262; F01D 9/00; F01D 9/041; F01D 25/24; F01D 25/30; F02C 7/04
See application file for complete search history.

(56) References Cited

U.S. PATENT DOCUMENTS

| | | | |
|---|---|---|---|
| 6,511,294 B1 | 1/2003 | Mielke et al. | |
| 8,720,207 B2 | 5/2014 | Gersbach et al. | |
| 9,376,935 B2 | 6/2016 | Eleftheriou et al. | |
| 10,072,516 B2 | 9/2018 | Carr et al. | |
| 10,378,370 B2 | 8/2019 | Budnick et al. | |
| 10,641,114 B2 | 5/2020 | Ols et al. | |
| 11,448,097 B1 | 9/2022 | Lefebvre | |
| 2015/0285098 A1* | 10/2015 | De Sousa | F01D 25/243 415/214.1 |

(Continued)

FOREIGN PATENT DOCUMENTS

| | | |
|---|---|---|
| EP | 3008291 B1 | 8/2018 |
| WO | 20210049523 A1 | 3/2021 |
| WO | WO-2021049523 A1 * | 3/2021 ............. F01D 25/26 |

OTHER PUBLICATIONS

English translation of Hirata WO2021049523A1 (Year: 2021).*
European Search Report issued in counterpart application 23156404.8 dated Jul. 18, 2023.

*Primary Examiner* — Scott J Walthour
(74) *Attorney, Agent, or Firm* — NORTON ROSE FULBRIGHT CANADA LLP.

(57) ABSTRACT

An aircraft engine, comprising: a first wall and a second wall defining a gaspath between the first wall and the second wall, the gaspath extending around a central axis, each of the first wall and the second wall having a gaspath side facing the gaspath and an opposed side facing away from the gaspath; struts circumferentially distributed around the central axis, the struts extending across the gaspath, a strut of the struts having an airfoil including a leading edge, a trailing edge, a first end secured to the first wall, and a second end secured to the second wall; and protrusions extending from a baseline surface of the opposed side of the first wall, the protrusions increasing a thickness of the first wall, a protrusion of the protrusions overlapping a location where the leading edge or the trailing edge meets the gaspath side of the first wall.

19 Claims, 4 Drawing Sheets

(56) References Cited

U.S. PATENT DOCUMENTS

| | | | |
|---|---|---|---|
| 2015/0345330 A1* | 12/2015 | Budnick | F01D 25/24 |
| | | | 415/177 |
| 2016/0061046 A1* | 3/2016 | Ols | F01D 25/24 |
| | | | 415/211.1 |
| 2016/0290158 A1 | 10/2016 | Slavens et al. | |
| 2018/0216476 A1 | 8/2018 | Pardo | |
| 2022/0325635 A1* | 10/2022 | Hirata | F01D 25/26 |

* cited by examiner

AIRCRAFT ENGINE STRUTS WITH STIFFENING PROTRUSIONS

TECHNICAL FIELD

The application relates generally to aircraft engines and, more particularly, to struts used in aircraft engines.

BACKGROUND OF THE ART

Aircraft engines, such as gas turbine engines, include inner and outer walls or casings defining a gaspath therebetween. The inner and outer walls are structurally connected to one another via a series of struts circumferentially distributed about a central axis. These struts transfer loads from one or more shaft(s) of the aircraft engines to an outer casing. The outer casing may be secured to an aircraft. However, stress concentrations may occur where these struts meet the inner and outer walls. Improvements are therefore sought.

SUMMARY

In one aspect, there is provided an aircraft engine, comprising: a first wall and a second wall defining a gaspath between the first wall and the second wall, the gaspath extending around a central axis, each of the first wall and the second wall having a gaspath side facing the gaspath and an opposed side facing away from the gaspath; struts circumferentially distributed around the central axis, the struts extending across the gaspath, a strut of the struts having an airfoil including a leading edge, a trailing edge, a first end secured to the first wall, and a second end secured to the second wall; and protrusions extending from a baseline surface of the opposed side of the first wall, the protrusions increasing a thickness of the first wall, a protrusion of the protrusions overlapping a location where the leading edge or the trailing edge meets the gaspath side of the first wall.

The aircraft engine may include any of the following features, in any combinations.

In some embodiments, the aircraft engine includes a compressor section, the struts located upstream of the compressor section.

In some embodiments, a fillet extends around the first end of the strut, the fillet merging in the airfoil and in the gaspath side of the first wall, the location including an intersection between the fillet and the gaspath side of the first wall.

In some embodiments, the airfoil includes a chord line connecting the leading edge to the trailing edge, the protrusion intersected by a projection of the chord line on the opposite side of the first wall.

In some embodiments, the protrusion has a length extending from a first protrusion end to a second protrusion end in a direction parallel to a direction of an airflow flowing in the gaspath, a ratio of the length to a nominal thickness of the wall ranging from 3 to 40.

In some embodiments, the ratio of the length to the nominal thickness ranges from 8 to 12.

In some embodiments, the protrusion has a width in a direction transverse to a direction of an airflow flowing in the gaspath, a ratio of the width to a nominal thickness of the wall ranging from 3 to 40.

In some embodiments, the ratio of the width to the nominal thickness ranges from 8 to 12.

In some embodiments, an intersection between the protrusion and the opposite side of the first wall has a circular perimeter.

In some embodiments, a ratio of a thickness of the protrusion to a nominal thickness of the first wall ranges from 0.1 to 5.

In some embodiments, the ratio ranges from 0.4 to 1.

In some embodiments, the protrusion overlaps the location where the leading edge meets the gaspath side of the first wall.

In some embodiments, another protrusion of the protrusions overlaps a second location where the trailing edge meets the gaspath side of the first wall.

In another aspect, there is provided an inlet case for an aircraft engine, comprising: a conduit annularly extending around a central axis, the conduit having an inlet oriented in a substantially radial direction and an outlet oriented in a substantially axial direction, the conduit defined between a first wall and a second wall, each of the first wall and the second wall having a gaspath side facing the conduit and an opposed side facing away from the conduit; struts circumferentially distributed around the central axis, the struts extending across the gaspath, a strut of the struts having an airfoil including a leading edge, a trailing edge, a first end secured to the first wall, and a second end secured to the second wall; and protrusions extending from a baseline surface of the opposed side of the first wall, the protrusions increasing a thickness of the first wall, a protrusion of the protrusions overlapping a location where the leading edge or the trailing edge meets the gaspath side of the first wall.

The inlet case may include any of the following features, in any combinations.

In some embodiments, the first wall, the second wall, and the struts are part of a monolithic body.

In some embodiments, a fillet extends around the first end of the strut, the fillet merging in the airfoil and in the gaspath side of the first wall, the location including an intersection between the fillet and the gaspath side of the first wall.

In some embodiments, the protrusion has a length extending from a first protrusion end to a second protrusion end in a direction parallel to a direction of an airflow flowing in the conduit, a ratio of the length to a nominal thickness of the wall ranging from 3 to 40.

In some embodiments, the ratio of the length to the nominal thickness ranges from 8 to 12.

In some embodiments, a ratio of a thickness of the protrusion to a nominal thickness of the first wall ranges from 0.1 to 5.

In some embodiments, the ratio ranges from 0.4 to 1.

In yet another aspect, there is provided a casted part for an aircraft engine, comprising: a gaspath extending circumferentially around a central axis; a first wall and a second wall defining the gaspath between the first wall and the second wall, each of the first wall and the second wall having a gaspath side facing the gaspath and an opposed side facing away from the gaspath; struts circumferentially distributed around the central axis, the struts extending across the gaspath, a strut of the struts having an airfoil including a leading edge, a trailing edge downstream of the leading edge relative to a direction of an airflow flowing in the gaspath, a first end secured to the first wall, and a second end secured to the second wall; and protrusions extending from a baseline surface of the opposed side of the first wall to increase a thickness of the first wall, a protrusion of the protrusions overlapping a location where the leading edge or the trailing edge meets the gaspath side of the first wall.

DESCRIPTION OF THE DRAWINGS

Reference is now made to the accompanying figures in which.

DETAILED DESCRIPTION

Figure 1:
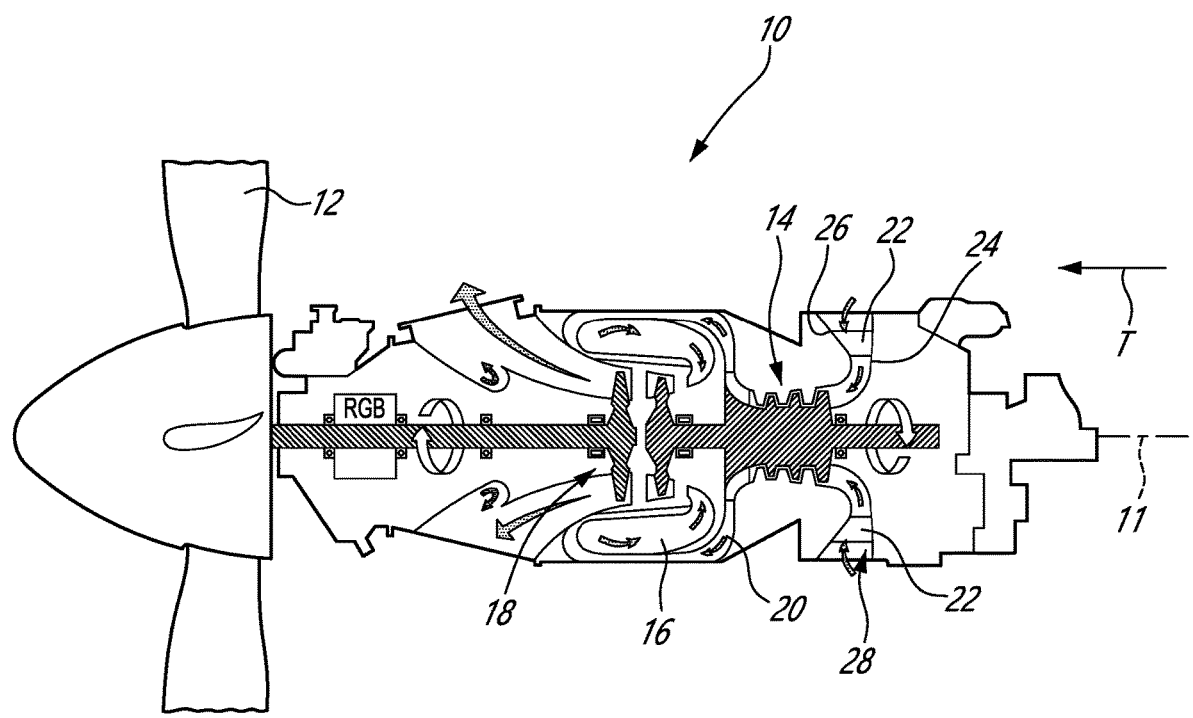
FIG. 1 is a schematic cross-sectional view of an aircraft engine depicted as a turboprop engine.

FIG. 1 illustrates an aircraft engine depicted as a gas turbine engine 10 of a type preferably provided for use in subsonic flight, and in driving engagement with a rotatable load, which is depicted as a propeller 12. The gas turbine engine 10 has in serial flow communication a compressor section 14 for pressurizing the air, a combustor 16 in which the compressed air is mixed with fuel and ignited for generating an annular stream of hot combustion gases, and a turbine section 18 for extracting energy from the combustion gases. In the embodiment shown, the gas turbine engine 10 is depicted as a turboprop engine, but the present disclosure applies to any aircraft engine such as turbofan and turboshaft.

It should be noted that the terms "upstream" and "downstream" used herein refer to the direction of an air/gas flow passing through a gaspath 20 of the gas turbine engine 10. The gaspath 20 may be annular. It should also be noted that the term "axial", "radial", "angular" and "circumferential" are used with respect to a central axis 11 of the gaspath 20, which may also be a central axis of gas turbine engine 10. The gas turbine engine 10 is depicted as a reverse-flow engine in which the air flows in the gaspath 20 from a rear of the engine 10 to a front of the engine 10 relative to a direction of travel T of the engine 10. This is opposite than a through-flow engine in which the air flows within the gaspath 20 in a direction opposite the direction of travel T, from the front of the engine towards the rear of the engine 10. The principles of the present disclosure may apply to reverse-flow and through flow engines and to any other gas turbine engines, such as a turbofan engine and a turboshaft engine.

Figure 2:
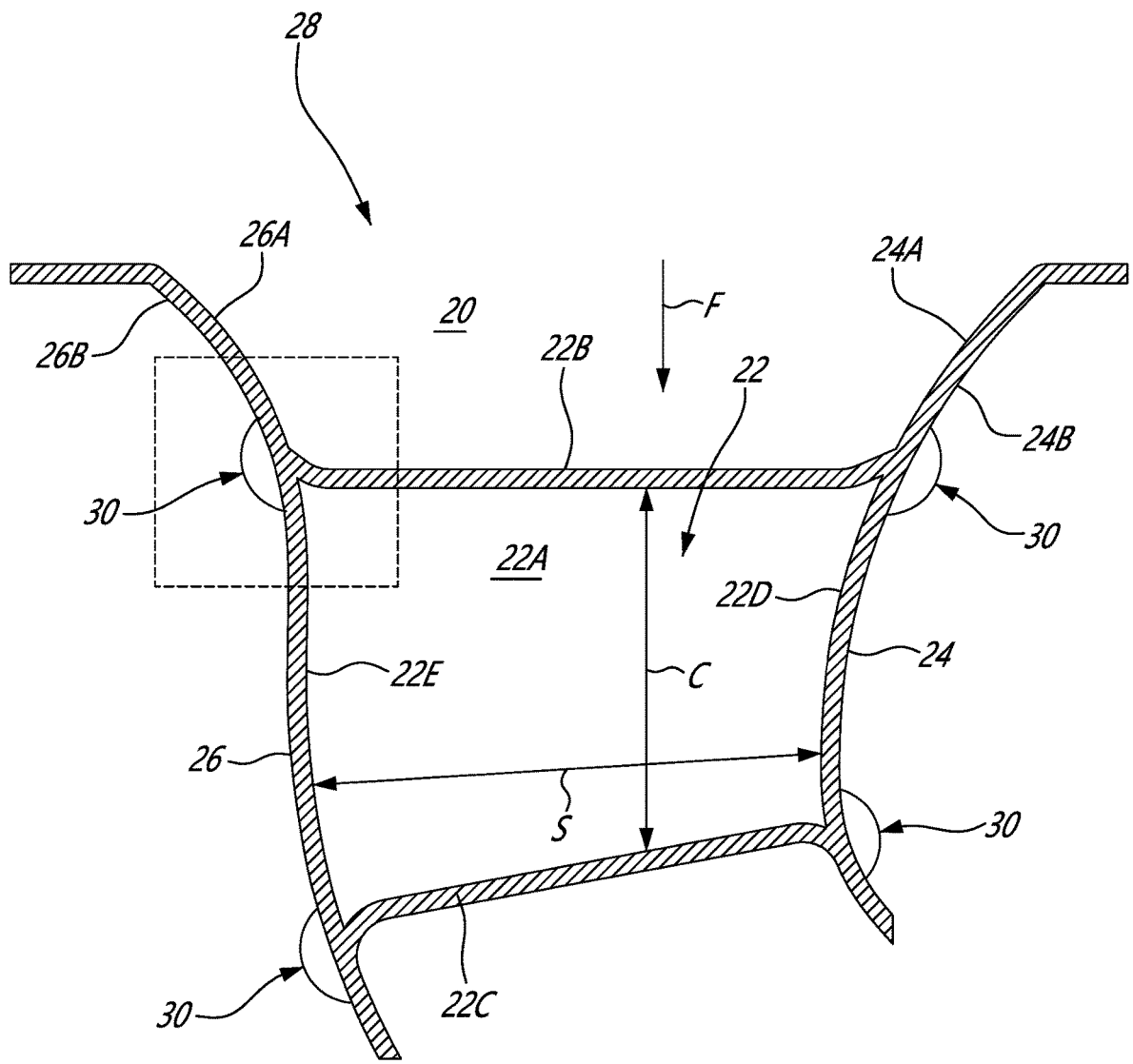
FIG. 2 is a cross-sectional view of a portion of an inlet case of the aircraft engine of FIG. 1 in accordance with one embodiment.

Referring to FIGS. 1-2, in the present embodiment, the gas turbine engine 10 includes struts 22 circumferentially distributed about the central axis 11. The struts 22 extend from an aft wall 24 to a fore wall 26 and across the gaspath 20. The aft wall 24 is axially offset from the fore wall 26 relative to the central axis 11. However, in other configurations, the two walls defining the gaspath 20 may be radially offset from one another. The aft wall 24 and the fore wall 26 may be annular and extend circumferentially around the central axis 11. The aft wall 24 has a gaspath side 24A facing the gaspath 20 and an opposed side 24B facing away from the gaspath 20. Similarly, the fore wall 26 has a gaspath side 26A facing the gaspath 20 and an opposed side 26B facing away from the gaspath 20.

The struts 22 are used to structurally connect components of the gas turbine engine 10 together. Struts may be used to secure a core of an engine to an outer casing. The gas turbine engine 10 includes vanes in the compressor section 14. Vanes may also be disposed in the turbine section 18. The purpose of vanes, which are stationary parts (e.g., non-rotating) is to re-direct an airflow F within the gaspath 20 such that the airflow F meets the downstream rotating blades at a specified angle of attack. The vanes are typically not used to structurally connect components together. Usually, struts 22 may have an aerodynamic profile that may be symmetrical with respect to a plane intersecting both the leading and trailing edges of the struts 22. Vanes typically have a cambered profile. Struts 22 are designed to minimize an influence on the surrounding airflow F in the gaspath 20. Moreover, struts 22 may have a substantially greater chord (e.g., 2 times or more) than that of vanes.

Referring to FIG. 2, the struts 22 are depicted here as being located within an inlet case 28 of the gas turbine engine 10. The inlet case 28 leads to the compressor section 14 and curves from a substantially radial orientation where air enters the inlet conduit 28 from the environment to a substantially axial orientation before the air flows into the compressor section 14. The inlet case 28 may be a monolithic body including the struts 22, the aft wall 24, and the fore wall 26. The monolithic body may be a casted part. It will be appreciated that struts 22 may be located anywhere within the gaspath 20. The struts 22 may be located between inner and outer casings of a turbofan engine, within a bypass conduit of such engine. Any suitable location for struts 22 is contemplated. Struts may be located in the compressor section 14, in the turbine section 18, in a mid-turbine frame disposed between a high-pressure and a low-pressure turbine, and so on.

The below description uses the singular form, but may be applied similarly to all of the struts 22. The strut 22 includes an airfoil 22A having a leading edge 22B and a trailing edge 22C downstream of the leading edge 22B relative to a direction of the airflow F flowing in the gaspath 20. A chord C separates the leading edge 22B from the trailing edge 22C. The airfoil 22A extends from a first end 22D to a second end 22E spaced from the first end 22D by a span S of the airfoil 22A. The first end 22D is secured to the aft wall 24 whereas the second end 22E is secured to the fore wall 26. In the embodiment shown, the span S is oriented in a direction being substantially axial. However, in other configurations, the span S of the airfoil of the struts may be oriented in a substantially radial orientation relative to the central axis 11. The struts 22 may be hollow or solid. In some embodiments, the hollow struts define internal passages used for air/oil/scavenge lines, electrical wires or elements of power transmission (i.e. shafts).

The areas around leading and trailing edges 22B, 22C of the struts 22 are typically highly loaded which causes significant stresses. The stresses may come from thermal loads, vibrations, and loads imparted to the aircraft engine 10 during maneuvers. The stresses caused by these loads are critical in order to meet the durability requirements for the entire part. A possible solution would be to increase the thickness of an entirety of the aft and fore walls 24, 26. However, this would create weight penalties and may be unsatisfactory for thermal induced stresses. The inlet case 28 of the present disclosure may at least partially alleviate these drawbacks.

Figure 3:
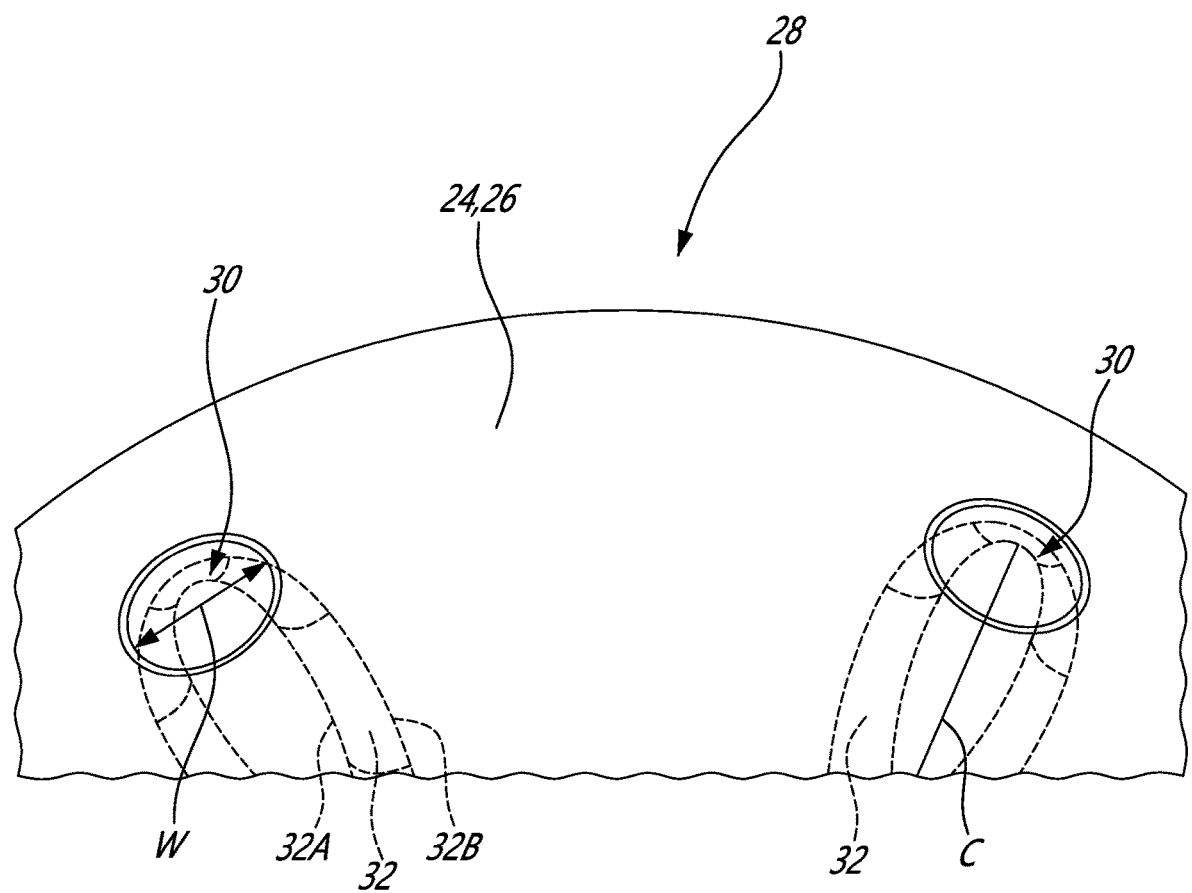
FIG. 3 is a three-dimensional view of a portion of the inlet case of FIG. 2.
Figure 4:
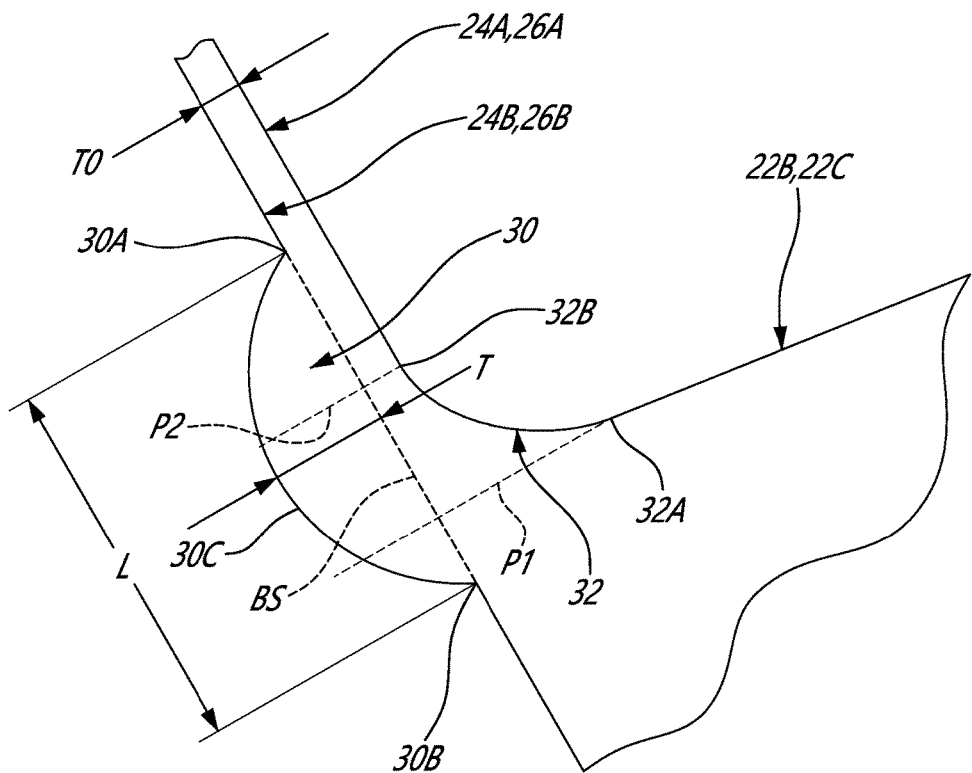
FIG. 4 is an enlarged view of a portion of FIG. 2 illustrating a protrusion in accordance with one embodiment.

Referring to FIGS. 2-4, in some embodiments, the aft wall 24 and the fore wall 26 define stiffening protrusions, referred to as protrusions 30 herein below, that extend from a baseline surface BS of the opposed sides 24B, 26B of the aft and fore walls 24, 26. The baseline surface BS corresponds to a surface of the opposite sides 24B, 26B of the aft and fore walls 24, 26 free of the protrusions 30. The protrusions 30 may be parts of the monolithic body of the inlet case 28. The protrusions 30 are used to locally increase thicknesses of the aft and fore walls 24, 26 at the protrusions 30. Herein, "locally" means that the thickness of the aft and fore walls 24, 26 is increased at discrete locations corresponding to the protrusions. The thickness of the aft and fore walls 24, 26 may correspond to the nominal thickness outside the protrusions. As shown in FIG. 4, the protrusions 30 overlap locations where the leading edges 22B and the trailing edge 22C of the airfoil 22A meet the gaspath sides 24A, 26A of the aft and fore walls 24, 26. In the present case, the protrusions 30 are located at both of the leading and trailing edges 22B, 22C and at both of the first and second ends 22D, 22E of the struts 22. It will be appreciated that the protrusions 30 may overlap locations where the leading edges 22B of the airfoils 22A meet the aft wall 24, locations where the leading edges 22B meet the fore wall 26, locations where the trailing edges 22C meet the aft wall 24, and/or locations where the trailing edges 22C meet the fore wall 26. Any combinations is contemplated. Any location exhibiting high stress concentration may benefit from the disclosed protrusions 30.

Referring more particularly to FIGS. 3-4, fillets 32 are located at intersections between the airfoils 22A and the aft and fore walls 24, 26. The fillets 32 merge in the airfoils 22A and in the gaspath sides 24A, 26A of the aft and fore walls 24, 26. The fillets 32 extend from first edges 32A at the airfoils 22A to second edges 32B at the gaspath sides 24A, 26A of the aft and fore walls 24, 26. As illustrated, the protrusions 30 overlap locations that include intersections between the fillets 32 and the gaspath sides 24A, 26A of the aft and fore walls 24, 26. Stated differently, the protrusions 30 may be intersected by first projections P1 of the first edges 32A of the fillets 32 at the leading and trailing edges 22B, 22C on the opposite sides 24B, 26B of the aft and fore walls 24, 26. The first projections P1 correspond to imaginary lines extending from the first edges 32A of the fillets 32 in a direction parallel to the span S of the airfoils 22A. In the present embodiment, the protrusions 30 are intersected by second projections P2 of the second edges 32B of the fillets 32 at the leading and trailing edges 22B, 22C on the opposite sides 24B, 26B of the aft and fore walls 24, 26. The second projections P2 correspond to imaginary lines extending from the second edges 32B of the fillets 32 in the direction parallel to the span S of the airfoils 22A. As shown in FIG. 3, the airfoils 22A define a symmetrical profile, the protrusions 30 may be centered relative to the symmetrical profile. In the present embodiment, the protrusions 30 are intersected by projections of the chord lines C on the opposite sides 24B, 26B of the aft and fore walls 24, 26.

Referring more particularly to FIG. 4, each of the protrusions 30 has a length L extending from a first protrusion end 30A to a second protrusion end 30B in a direction parallel to the direction of the airflow F. A ratio of the length L to a nominal thickness T0 of the aft and fore walls 24, 26 may range from 3 to 40, preferably from 8 to 12. The protrusion 30 has a width W (FIG. 3) in a direction transverse to the direction of the airflow F. A ratio of the width W to the nominal thickness T0 may range from 3 to 40, preferably from 8 to 12. A ratio of a thickness T of the protrusion to the nominal thickness T0 of the aft wall 24 ranges from 0.1 to 5, preferably from 0.4 to 1. Herein, the thickness T of the protrusion 30 extends from the baseline surface BS to an apex 30C of the protrusion 30. The thickness T may therefore correspond to a maximum thickness of the protrusion 30. The nominal thickness T0 corresponds to a thickness of the aft and fore walls 24, 26 outside the protrusions 30.

In the embodiment shown, intersections between the protrusions 30 and the opposite sides 24B, 26B of the aft and fore walls 24, 26 have circular perimeters. In other words, the protrusions 30 may be spherical. It will be appreciated that fillets may be used to merge the protrusions 30 to the opposite sides 24B, 26B of the aft and fore walls 24, 26.

Figures 5A, 5B, 5C:
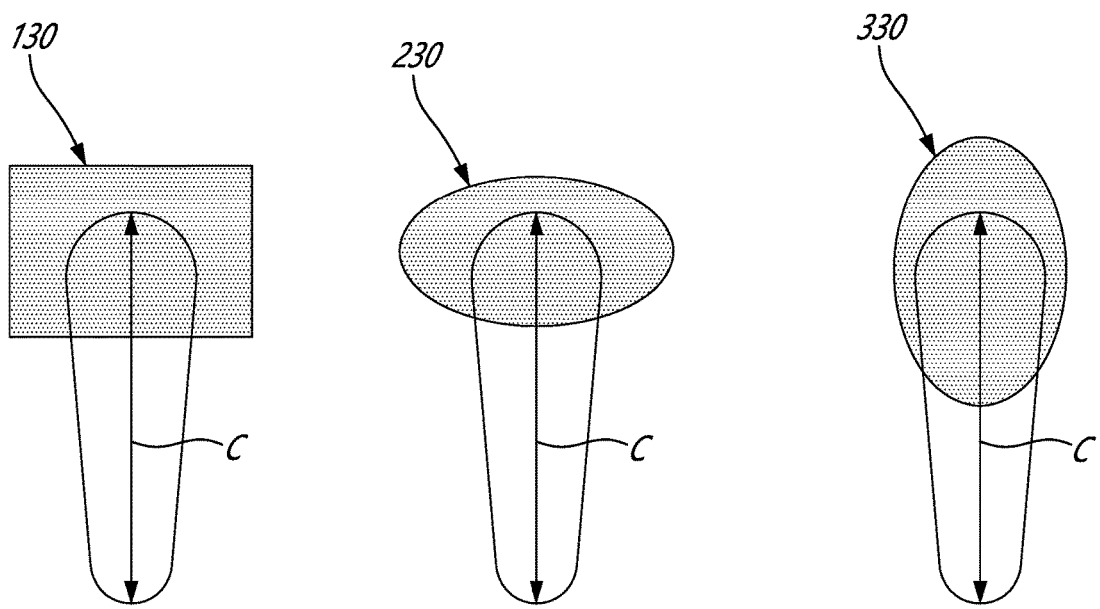
FIGS. 5A to 5C illustrate plan views of protrusions in accordance with other embodiments.

Referring now to FIGS. 5A-5C, different shapes for the protrusions are shown. In FIG. 5A, the protrusion 130 has a rectangular footprint. In FIG. 5B, the protrusion 230 has an elliptical footprint, with a long axis extending in a direction transverse to the chord C of the struts 22. In FIG. 5C, the protrusion 330 has an elliptical footprint with a long axis extending in a direction parallel to the chord C of the struts 22.

In some embodiments, the protrusions 30 may be used in conjunction with fillets 32 having a greater radius. A ratio of the thickness T of the protrusions 30 to the radius of the fillets 32 may range from 0 to 2, preferably from 0.3 to 0.8.

The disclosed protrusions 30 may reduce stress; increase the life of a part (e.g., inlet case 28), by up to 8 times in some embodiments; may have negligible impact on temperature distribution; may have negligible impact on overall casings stiffness; may have a negligible impact on the weight; may be implemented at low cost; and may have no impact on the airflow F since the protrusions 30 sit outside the gaspath 20.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. An inlet case for an aircraft engine, comprising:
a conduit annularly extending around a central axis, the conduit having an inlet oriented in a substantially radial direction and an outlet oriented in a substantially axial direction, the conduit defined between a first wall and a second wall, each of the first wall and the second wall having a gaspath side facing the conduit and an opposed side facing away from the conduit;
struts circumferentially distributed around the central axis, the struts extending across the gaspath, a strut of the struts having an airfoil including a leading edge, a trailing edge, a first end secured to the first wall, and a second end secured to the second wall, the airfoil having a chord line connecting the leading edge to the trailing edge, wherein the volume of each strut is defined in part by each of the first wall, the second wall, the leading edge, and the trailing edge; and
protrusions extending from a baseline surface of the opposed side of the first wall and external to the respective volume of each strut, the protrusions being circumferentially distributed around the central axis and being circumferentially spaced apart from one another, the protrusions increasing a thickness of the first wall, a protrusion of the protrusions overlapping a location where the leading edge or the trailing edge meets the gaspath side of the first wall, the protrusion extending from a first protrusion end to a second protrusion end in a direction of an airflow in the gaspath, the first protrusion end and the second protrusion end located on the baseline surface, the first protrusion end being upstream of the leading edge or downstream of the trailing edge relative to the airflow, the second protrusion end being downstream of the leading edge and upstream of the trailing edge, the protrusion intersected by a projection of the chord line on the opposed side of the first wall.

2. The inlet case of claim 1, wherein the first wall, the second wall, and the struts are part of a monolithic body.

3. The inlet case of claim 1, comprising a fillet extending around the first end of the strut, the fillet merging in the airfoil and in the gaspath side of the first wall, the location including an intersection between the fillet and the gaspath side of the first wall.

4. The inlet case of claim 1, wherein the protrusion has a length extending from the first protrusion end to the second protrusion end in the direction parallel to the airflow flowing in the conduit, a ratio of the length to a nominal thickness of the first wall ranging from 3 to 40.

5. The inlet case of claim 4, wherein the ratio of the length to the nominal thickness ranges from 8 to 12.

6. The inlet case of claim 1, wherein a ratio of a thickness of the protrusion to a nominal thickness of the first wall ranges from 0.1 to 5.

7. The inlet case of claim 6, wherein the ratio ranges from 0.4 to 1.

8. An aircraft engine, comprising:
a first wall and a second wall defining a gaspath between the first wall and the second wall, the gaspath extending around a central axis, each of the first wall and the second wall having a gaspath side facing the gaspath and an opposed side facing away from the gaspath;
struts circumferentially distributed around the central axis, the struts extending across the gaspath, a strut of the struts having an airfoil including a leading edge, a trailing edge, a first end secured to the first wall, and a second end secured to the second wall, the airfoil having a chord line connecting the leading edge to the trailing edge, wherein the volume of each strut is defined in part by each of the first wall, the second wall, the leading edge, and the trailing edge; and
protrusions extending from a baseline surface of the opposed side of the first wall and external to the respective volume of each strut, the protrusions being circumferentially distributed around the central axis and being circumferentially spaced apart from one another, the protrusions increasing a thickness of the first wall, a protrusion of the protrusions overlapping a location where the leading edge or the trailing edge meets the gaspath side of the first wall, the protrusion extending from a first protrusion end to a second protrusion end in a direction of an airflow in the gaspath, the first protrusion end and the second protrusion end located on the baseline surface, the first protrusion end being upstream of the leading edge or downstream of the trailing edge relative to the airflow, the second protrusion end being downstream of the leading edge and upstream of the trailing edge, the protrusion intersected by a projection of the chord line on the opposed side of the first wall.

9. The aircraft engine of claim 8, comprising a compressor section, the struts located upstream of the compressor section.

10. The aircraft engine of claim 8, comprising a fillet extending around the first end of the strut, the fillet merging in the airfoil and in the gaspath side of the first wall, the location including an intersection between the fillet and the gaspath side of the first wall.

11. The aircraft engine of claim 8, wherein the protrusion has a length extending from the first protrusion end to the second protrusion end in a direction parallel to the direction of the airflow flowing in the gaspath, a ratio of the length to a nominal thickness of the first wall ranging from 3 to 40.

12. The aircraft engine of claim 11, wherein the ratio of the length to the nominal thickness ranges from 8 to 12.

13. The aircraft engine of claim 8, wherein the protrusion has a width in a direction transverse to a direction of an airflow flowing in the gaspath, a ratio of the width to a nominal thickness of the first wall ranging from 3 to 40.

14. The aircraft engine of claim 13, wherein the ratio of the width to the nominal thickness ranges from 8 to 12.

15. The aircraft engine of claim 8, wherein an intersection between the protrusion and the opposed side of the first wall has a circular perimeter.

16. The aircraft engine of claim 8, wherein a ratio of a thickness of the protrusion to a nominal thickness of the first wall ranges from 0.1 to 5.

17. The aircraft engine of claim 16, wherein the ratio ranges from 0.4 to 1.

18. The aircraft engine of claim 8, wherein the protrusion overlaps the location where the leading edge meets the gaspath side of the first wall.

19. The aircraft engine of claim 18, wherein another protrusion of the protrusions overlaps a second location where the trailing edge meets the gaspath side of the first wall.

* * * * *